(12) United States Patent
Adda

(10) Patent No.: US 6,445,497 B1
(45) Date of Patent: Sep. 3, 2002

(54) OPTICAL SIGHTING SYSTEM

(75) Inventor: Maurice Adda, Antony (FR)

(73) Assignee: Aerospatiale Matra Missiles, Paris (FR)

( * ) Notice: Subject to any disclaimer, the term of this patent is extended or adjusted under 35 U.S.C. 154(b) by 6 days.

(21) Appl. No.: 09/621,135

(22) Filed: Jul. 20, 2000

(30) Foreign Application Priority Data

Jul. 22, 1999 (FR) .............................................. 99 09512

(51) Int. Cl.⁷ .................. G02B 27/32; G02B 23/00; F41G 1/00
(52) U.S. Cl. .................. 359/428; 356/247; 42/113; 42/119; 42/122; 89/41.19
(58) Field of Search ................... 359/424, 427, 359/428, 630; 356/247, 251; 42/113, 119, 122, 123; 244/3.16; 89/41.19; 396/51

(56) References Cited

U.S. PATENT DOCUMENTS

| | | |
|---|---|---|
| 4,018,533 A | 4/1977 | Haines |
| 4,540,238 A | 9/1985 | Edwards |
| 5,214,285 A | 5/1993 | Metivier |
| 5,784,182 A | 7/1998 | Francoeur et al. |
| 5,946,075 A * | 8/1999 | Horn .......................... 351/246 |

OTHER PUBLICATIONS

French Novelty Search Report, dated Mar. 10, 2000.

\* cited by examiner

*Primary Examiner*—Jon Henry
(74) *Attorney, Agent, or Firm*—Stevens, Davis, Miller & Mosher, LLP

(57) ABSTRACT

An optical sighting system includes at least one optical channel with which there is associated at least one reticle. The reticle includes at least one mark which demarcates a blind spot, which is visible to an observer using the optical sighing system and which is centered approximately about a centering point that is situated substantially at a distance which is representative of a sighting angle of between 13° and 18°, with respect to a predetermined direction of observation along a first direction. This first direction is representative on the optical sighting system of the direction passing substantially by the centers of the eyes of an observer who is using the optical sighting system.

12 Claims, 2 Drawing Sheets

OPTICAL SIGHTING SYSTEM

Figure 1:
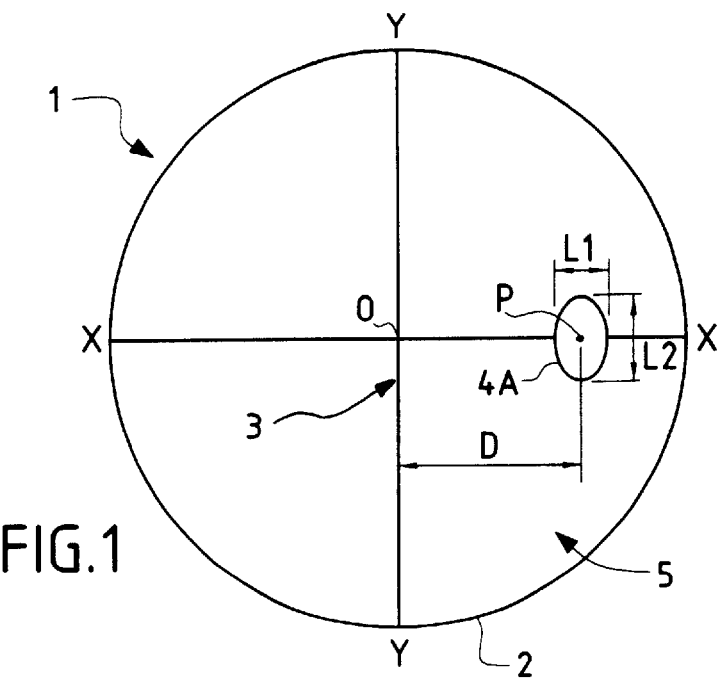

The present invention relates to an optical sighting system.

Said optical sighting system, for example military observation goggles, which may, within the framework of the present invention, be an exclusively optical system or an optoelectric system, comprises in a known manner at least one optical channel, with which there is associated at least one reticle. Such a reticle makes it possible, in particular, to visualize a predetermined direction of observation, which generally corresponds to the central axis or optical axis of said optical channel. For this purpose, said reticle usually comprises an indicator in the shape of a cross, which is positioned such that the intersection of the axes of the cross signals said predetermined direction of observation.

It is known that, in particular by reason of physical features of the eyes, certain portions of the field of vision of a human being are not visible or are visible with difficulty. This drawback is of course always present when an observer uses an optical sighting system for observation. This problem of vision can be particularly bothersome or unfortunate, especially when the observer is for example somebody from the military and when said optical sighting system corresponds to observation goggles or forms part of a target detection and/or weapons (missiles, rockets, etc.) guidance device of a weapons system, since in this case it may happen that an enemy target (infantryman, tank, etc.) located in an invisible portion of this kind is not detected by the observer, the consequences of such a situation possibly being very serious.

This problem of vision is all the more considerable since the human eye carries out visual adaptations or corrections which are such that the field of vision appears continuous to the human being and that the latter does not consider the existence of an invisible portion of this kind and is therefore unable to locate it.

The present invention relates to an optical sighting system which makes it possible to remedy these drawbacks.

For this purpose, according to the invention, said optical sighting system comprising at least one optical channel with which there is associated at least one reticle is noteworthy in that said reticle comprises at least one mark which is visible to an observer using said optical sighting system and which is centered approximately about a centering point, said centering point being situated substantially at a distance which is representative of a sighting angle of between 13° and 18°, with respect to a predetermined direction of observation, according to a first direction, said first direction being representative on said optical sighting system of the direction passing substantially by the centers of the eyes of an observer who is using said optical sighting system.

Thus, said reticle makes it possible to alert any observer using said optical sighting system of the existence of a problem of vision in the directions of observation situated level with and/or in proximity to the mark visualized by virtue of the invention.

More precisely, said mark makes it possible to show up a <<blind spot>> existing for any human eye. This blind spot which represents a portion of the field of vision of the eye, inside which no vision is possible, is due to the absence, within the retina, of light-sensitive nerves cells where the optic nerve arrives in said retina.

Consequently, by virtue of the invention, any observer using said optical sighting system is warned about whatever is at risk of not being seen by him when looking fixedly at the center of the reticle and is continually informed of the position of the image of this blind spot in the scene observed. In particular, a military observer is thus alerted that an invisible potential target might be situated in his field of vision, in alignment with said mark.

Advantageously, said reticle is formed in at least one focusing plane of said optical sighting system. For this purpose, said optical sighting system comprises known means for forming said reticle, for example means carrying out a projection of said mark into a reticular plane.

Moreover, in a simplified embodiment, said reticle comprises a single mark which is situated, with respect to said direction of observation and according to said first direction, on the same side as the eye used by an observer looking along said optical channel.

In another embodiment, said reticle comprises two marks situated on either side of said direction of observation along said first direction. Thus, sighting by means of the optical sighting system may be performed equally by the right eye and the left eye. Said optical sighting system, for example a field glass, can consequently be used equally well by an observer whose dominant eye is the right eye, as by an observer whose dominant eye is the left eye.

Furthermore, in a particular embodiment relating to a sighting system, for example binoculars, which comprises two optical channels, a first optical channel intended for the right eye of an observer and a second optical channel intended for the left eye of this observer, advantageously, said first optical channel comprises a reticle comprising a mark which is situated to the right of said direction of observation according to said first direction, and said second optical channel comprises a reticle comprising a mark which is situated to the left of said direction of observation along said first direction.

Within the framework of the present invention, said mark can of course exhibit various shapes.

In a first embodiment, said mark exhibits the shape of an ellipse:
  whose minor axis is oriented along said first direction and exhibits a length representative of a sighting angle of 7°; and
  whose major axis is oriented along a second direction orthogonal both to said first direction and to said direction of observation and exhibits a length representative of a sighting angle of 8°.

In a second embodiment, said mark exhibits an oblong shape provided at each of its ends along said first direction with a semicircle, the distance between the centers of said semicircles is representative of a sighting angle of 5°, and said mark exhibits a width representative of a sighting angle of 8°, according to said second direction which is orthogonal both to said first direction and to said direction of observation.

The figures of the appended drawing will elucidate the manner in which the invention may be embodied. In these figures, identical references denote similar elements.

FIG. 1 diagrammatically illustrates a reticle of an optical sighting system in accordance with the invention, in a first embodiment.

Figure 2:
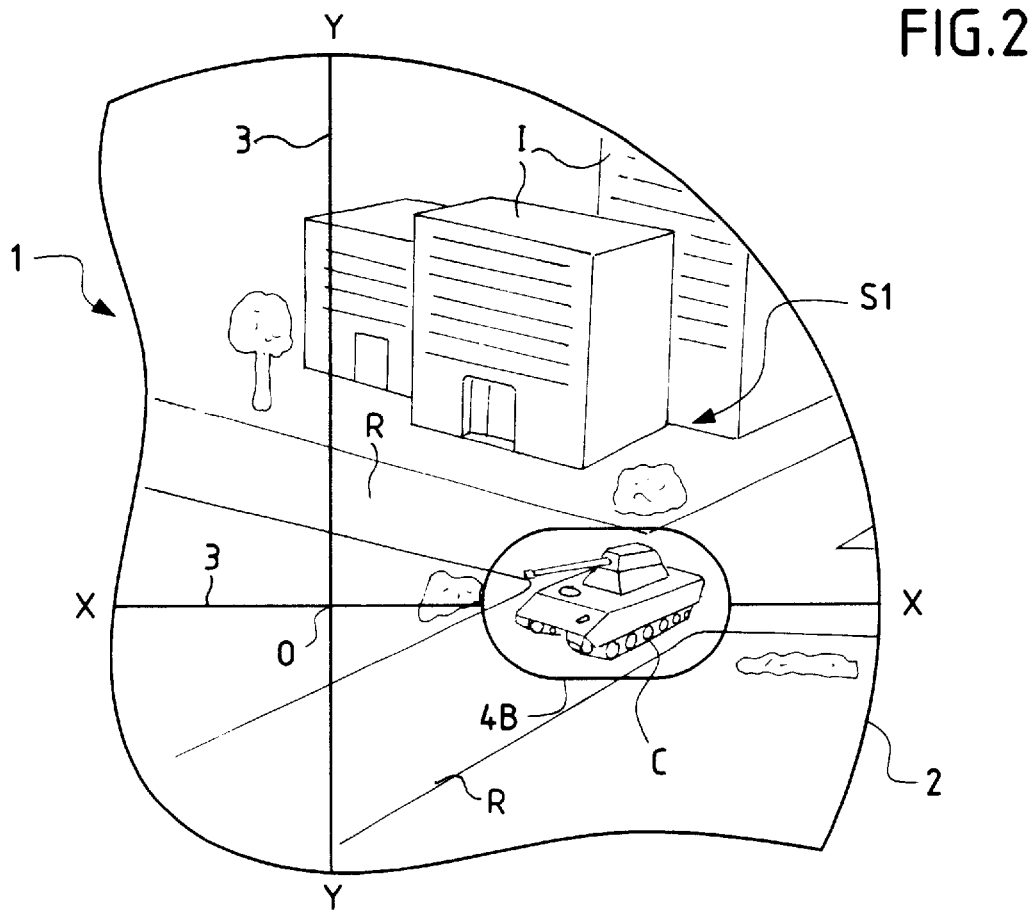
Figure 3:
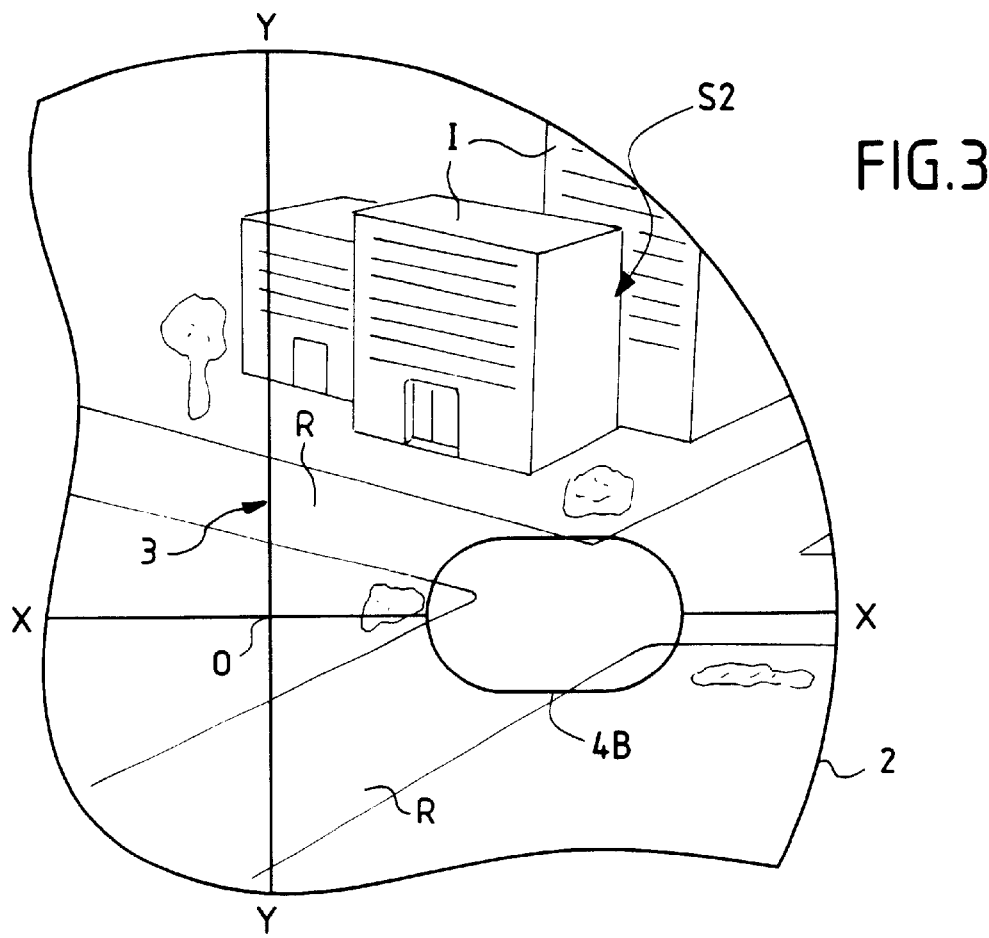

FIGS. 2 and 3 show partially one and the same scene which can observed by an optical sighting system in accordance with the invention, namely respectively such as it actually exists and such as it is seen by an observer.

Figure 4:
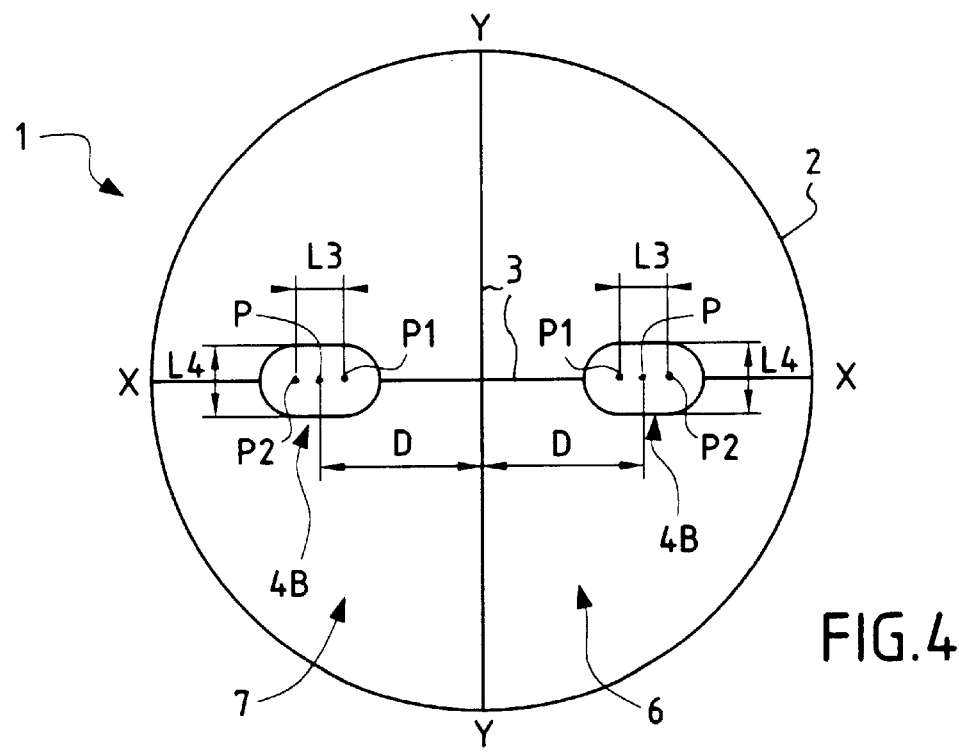

FIG. 4 diagrammatically illustrates a reticle of an optical sighting system in accordance with the invention, in a second embodiment.

The optical sighting system 1 in accordance with the invention and represented partially in FIG. 1 comprises an optical channel 2, with which there is associated a reticle 3.

In a known manner, said reticle 3 exhibits a cross shape: the crossover O of the axes of which illustrates a predetermined direction of observation which corresponds to the optical axis of said optical channel 2; and
whose axes respectively illustrate:
a first direction X—X, the so-called horizontal direction, which is representative on said optical sighting system 1 of the direction passing substantially by the centers of the eyes of an observer who is using said optical sighting system 1; and
a second direction Y—Y, the so-called vertical direction, which is orthogonal both to said direction X—X and to said direction of observation O.

According to the invention, said reticle 3 comprises, in addition, at least one mark 4A, 4B which is visible to an observer using said optical sighting system 1 and which is centered approximately about a centering point P. Said centering point P is situated substantially at a distance D from said point O (illustrating said direction of observation), according to said direction X—X. According to the invention, the distance D is such that it corresponds to a sighting angle which is between 13° and 18° and which is preferably equal to 15°.

Consequently, by virtue of the invention, said mark 4A, 4B makes it possible to indicate to any observer using the sighting system 1 the position of the image of the blind spot (due to the absence in the human eye of light-sensitive nerve cells where the optic nerve arrives in the retina) in the scene S1 or S2 thus observed. This observer is thus alerted to the risk of not seeing objects, in particular potential targets, situated in direct alignment with said mark 4A, 4B.

According to the invention, in order that the aforesaid effects may be obtained, said mark 4A, 4B is situated, with respect to said direction of observation O and along said first direction X—X, on the same side 5 as the eye, generally the dominant eye, used by an observer looking along said optical channel 2. In the example represented in FIG. 1, the mark 4A is situated on the right side 5. It therefore makes it possible to show up the image of the optical spot of the right eye of an observer. A symmetric embodiment, with respect to the direction Y—Y, makes it possible to show up the image of the optical spot of the left eye of the observer.

Consequently, as a function of the eye intended to be used to look along said optical channel 2, the reticle 3 can comprise either a mark situated on the appropriate side, as for example the mark 4A of FIG. 1 which is situated on the right side 5, or two marks 4B situated on either side of the point O, as represented in FIG. 4.

FIGS. 2 and 3 make it possible to show up clearly the characteristics and advantages of the present invention.

FIG. 2 illustrates a scene S1 (which can be observed by means of the sighting system 1) which is such as it actually exists. This scene S1 represents an urban environment comprising buildings I and roads R in which there is a target C, in this instance a tank. This target C is situated inside the mark 4B.

FIG. 3 shows a scene S2 which corresponds to the scene S1 and which is such as is seen by an observer looking at it with his right eye through the optical sighting system 1.

The target C situated in the direction of the blind spot of the right eye is not visible to this observer. However, by reason of visual corrections and adaptations made automatically by the eye, the portion situated about the point P of the scene seen S2 is not discontinuous, but represents a complete and clear image so that, without the present invention, the observer would not suspect this visual problem and the possible presence at the level of the mark 4B of a potential target C.

It will be noted that the left eye of an observer, of which the blind spot is located on the left side, sees as it is represented said portion of scene S1 represented in FIG. 2.

Within the framework of the present invention, the mark or marks of the reticle 3 can exhibit various shapes.

In the embodiment represented in FIG. 1, said mark 4A exhibits the shape of an ellipse:
whose minor axis is oriented along said direction X—X and exhibits a length L1 representative of a sighting angle of 7°; and
whose major axis is oriented along said direction Y—Y and exhibits a length L2 representative of a sighting angle of 8°.

In a second embodiment represented in FIG. 4, the reticle 3 comprises two marks 4B. Each mark 4B exhibits an oblong shape comprising at each of its ends along said direction X—X a semicircle. The distance L3 between the centers P1 and P2 of said semicircles is representative of a sighting angle of 5°. Additionally, said mark 4B exhibits a width L4 representative of a sighting angle of 8°, along the direction Y—Y.

In this last embodiment, a mark 4B is provided on the right side 6 and a mark 4B is provided on the left side 7 of the point O, thus making it possible to show up the images of the blind spots of respectively the right eye and the left eye of an observer.

The sighting system 1 of FIG. 4, for example a field glass, which includes a single optical channel can therefore be used equally well with the right eye and with the left eye.

In another embodiment (not represented), corresponding to a sighting system, for example binoculars, which comprises two optical channels, a first optical channel intended for the right eye of an observer and a second optical channel intended for the left eye of this observer:
said first optical channel comprises a reticle comprising a mark which is situated to the right of said direction of observation along said first direction; and
said second optical channel comprises a reticle comprising a mark which is situated to the left of said direction of observation along said first direction.

In addition to the aforesaid applications, the present invention can be applied to numerous other optical devices, in particular to:
military observation goggles;
a helicopter-borne viewfinder of an antitank weapon system;
a direct optical pathway of weapon systems (missile launcher, gun, rocket launcher, etc.); and
video pathways (for television or for thermal viewfinder).

What is claimed is:
1. An optical sighting system comprising:
at least one optical channel; and
at least one reticle associated with said at least one optical channel,
wherein said at least one reticle comprises at least one mark which is visible to an observer using said optical sighting system and which is centered approximately about a centering point (P) situated substantially at a distance (D) which is representative of a sighting angle of between 13° and 18°, with respect to a predetermined direction of observation (O), according to a first direction, said first direction being representative on said optical sighting system of a direction passing substantially by the centers of the eyes of an observer who is using said optical sighting system, and wherein said at least one mark exhibits a shape of an ellipse whose minor axis is oriented along said first direction and exhibits a length (L1) representative of a sighting angle of 7° and whose major axis is oriented along a second direction orthogonal both to said first direction and to said direction of observation (O) and exhibits a length (L2) representative of a sighting angle of 8°.

2. The optical sighting system as claimed in claim 1, wherein said at least one mark comprises a single mark which is situated, with respect to said direction of observation (O) and along said first direction, on a same side as an eye used by an observer looking along said at least one optical channel.

3. The optical sighting system as claimed in claim 1, wherein said at least one mark comprises two marks situated on either side of said direction of observation (O) and along said first direction.

4. The optical sighting system as claimed in claim 1, wherein said at least one optical channel comprises a first optical channel intended for the right eye of said observer and a second optical channel intended for the left eye of said observer, and said at least one reticle comprises (i) a first reticle comprising a mark which is associated with said first optical channel and which is situated to the right of said direction of observation along said first direction and (ii) a second reticle comprising a mark which is associated with said second optical channel and which is situated to the left of said direction of observation along said first direction.

5. The optical sighting system as claimed in claim 1, wherein said centering point (P) is situated, with respect to said direction of observation (O), substantially at a distance (D) which is representative of a sighting angle of approximately 15°.

6. The optical sighting system as claimed in claim 1, wherein said at least one reticle is formed in at least one focusing plane of said optical sighting system.

7. An optical sighting system comprising:

at least one optical channel; and at least one reticle associated with said at least one optical channel, wherein said at least one reticle comprises at least one mark which is visible to an observer using said optical sighting system and which is centered approximately about a centering point (P) situated substantially at a distance (D) which is representative of a sighting angle of between 13° and 18°, with respect to a predetermined direction of observation (O), according to a first direction, said first direction being representative on said optical sighting system of a direction passing substantially by the centers of the eyes of an observer who is using said optical sighting system, and wherein said at least one mark comprises (i) a first mark which exhibits an oblong shape provided at each of a first end and a second end along said first direction with a first semicircle and a second semicircle, respectively, wherein a distance (L3) between centers (P1, P2) of said first and second semicircles is representative of a sighting angle of 5° and (ii) a second mark which exhibits a width (L4) representative of a sighting angle of 8°, according to a second direction which is orthogonal both to said first direction and to said direction of observation (O).

8. The optical sighting system as claimed in claim 7, wherein said at least one mark comprises a single mark which is situated, with respect to said direction of observation (O) and along said first direction, on a same side as an eye used by an observer looking along said at least one optical channel.

9. The optical sighting system as claimed in claim 7, wherein said at least one mark comprises two marks situated on either side of said direction of observation (O) and along said first direction.

10. The optical sighting system as claimed in claim 7, wherein said at least one optical channel comprises a first optical channel intended for the right eye of said observer and a second optical channel intended for the left eye of said observer, and said at least one reticle comprises (i) a first reticle comprising a mark which is associated with said first optical channel and which is situated to the right of said direction of observation along said first direction and (ii) a second reticle comprising a mark which is associated with said second optical channel and which is situated to the left of said direction of observation along said first direction.

11. The optical sighting system as claimed in claim 7, wherein said centering point (P) is situated, with respect to said direction of observation (O), substantially at a distance (D) which is representative of a sighting angle of approximately 15°.

12. The optical sighting system as claimed in claim 7, wherein said at least one reticle is formed in at least one focusing plane of said optical sighting system.

* * * * *